(12) United States Patent
Henry et al.

(10) Patent No.: US 6,998,145 B2
(45) Date of Patent: Feb. 14, 2006

(54) PROCESS FOR MAKING CHEESE

(75) Inventors: Thomas Henry, McHenry, IL (US); Charles Hunt, DePere, WI (US); Jerry Urben, Waunakee, WI (US)

(73) Assignee: ConAgra Dairy Products Company, Naperville, IL (US)

( * ) Notice: Subject to any disclaimer, the term of this patent is extended or adjusted under 35 U.S.C. 154(b) by 127 days.

(21) Appl. No.: 10/086,134

(22) Filed: Feb. 27, 2002

(65) Prior Publication Data

US 2003/0008056 A1  Jan. 9, 2003

Related U.S. Application Data

(60) Provisional application No. 60/271,807, filed on Feb. 27, 2001.

(51) Int. Cl.
 *A23C 19/00* (2006.01)

(52) U.S. Cl. .......................... 426/582; 426/36; 426/39; 426/580

(58) Field of Classification Search ................. 426/34, 426/36, 39, 40, 42, 518, 524, 580, 582, 585
See application file for complete search history.

(56) References Cited

U.S. PATENT DOCUMENTS

| | | | |
|---|---|---|---|
| 4,339,468 A | 7/1982 | Kielsmeier | |
| 4,460,609 A | 7/1984 | Kristiansen et al. | |
| 4,592,274 A | 6/1986 | Tomatis | |
| 4,608,921 A | 9/1986 | Mongiello, Sr. | |
| 4,626,439 A | 12/1986 | Meyer | |
| 4,665,811 A | 5/1987 | Meyer | |
| 4,898,745 A | 2/1990 | Zamzow et al. | |
| 4,919,943 A | 4/1990 | Yee et al. | |
| 4,959,229 A | 9/1990 | Reddy et al. | |
| 5,200,216 A * | 4/1993 | Barz et al. ................ | 426/36 |
| 5,431,931 A | 7/1995 | Nauth et al. | |
| 5,431,946 A | 7/1995 | Vesely et al. | |
| 5,480,666 A | 1/1996 | Lindgren | |
| 5,520,934 A | 5/1996 | Meilleur | |
| 5,529,795 A | 6/1996 | Aldrovandi | |
| 5,567,464 A | 10/1996 | Barz et al. | |
| 5,895,671 A | 4/1999 | Adamany et al. | |
| 5,902,625 A | 5/1999 | Barz et al. | |
| 5,942,263 A | 8/1999 | Chen et al. | |
| 5,952,030 A | 9/1999 | Nelles et al. | |
| 5,967,026 A | 10/1999 | Nelles et al. | |
| 6,079,323 A | 6/2000 | Dzenis | |
| 6,086,926 A | 7/2000 | Bruce et al. | |
| 6,143,334 A | 11/2000 | Reinbold et al. | |
| RE37,264 E | 7/2001 | Chen et al. | |
| 6,319,526 B1 | 11/2001 | Dahlstrom et al. | |
| 6,440,481 B1 | 8/2002 | Gascoigne et al. | |
| 6,475,538 B2 * | 11/2002 | Thakar et al. ................ | 426/43 |
| 6,475,638 B1 | 11/2002 | Mitsuhashi et al. | |

OTHER PUBLICATIONS

Scott, R., Cheesemaking Practice, 2$^{nd}$ Ed. (1986), pp. 186-201, Elsevier Applied Science Publishers, London and New York.

* cited by examiner

*Primary Examiner*—Leslie Wong
(74) *Attorney, Agent, or Firm*—Bingham McCutchen, LLP

(57) ABSTRACT

An improved method for making cheese is provided. The method comprises pasteurizing and acidifying one or more dairy components to obtain a cheese diary product. The cheese dairy product is coagulated to form a coagulum comprising curd and whey. The coagulum is cut and the whey is removed therefrom, thereby leaving the curd. The curd is heated and kneaded to produce a fiberous mass. An extender is added to the curd or to the fiberous mass, and the extender comprises at least one source of fat. The fiberous mass is processed to produce a cheese product. By this method. By this method, the casein/fat ratio can be increased early in the process so that less fat is wasted through removal with the whey. The fat content of the cheese product can then increased later in the process through the use of the extender, thereby creating a more cost-effective product.

22 Claims, No Drawings

PROCESS FOR MAKING CHEESE

CROSS-REFERENCE TO RELATED APPLICATION

This application claims priority of U.S. Provisional Patent Application No. 60/271,807 filed Feb. 27, 2001, the entire disclosure of which is incorporated herein by reference.

BACKGROUND

The consumption of cheese continues to grow due to the varieties and forms available to the consumer and due to the popularity of Italian and Mexican foods such as pizza and tacos. Such foods, whether prepared at home or eaten out, often utilize cheese in a sliced, shredded or diced form. As popular foods develop and change, cheese performance expectations have broadened. Traditional cheeses, such as mozzarella and cheddar, are being modified to meet expectations and remain competitive. Although technologies have been developed to improve performance and reduce cost, a need still exists to streamline processing, provide new functionality, and narrow the quality gap between traditional cheeses and alternatives, which may include pizza cheese and taco cheese.

Pizza cheese and taco cheese are non-standard cheeses, which may contain safe and suitable food ingredients not specified in the standard of identity for mozzarella and cheddar cheeses. They often contain higher moisture, some form of starch, low cost dairy solids, emulsifying salts, gums and flavorings.

The quality level of pizza cheese differs from traditional mozzarella in flavor, texture, and melt. In addition, the handling requirements for frozen pizza cheese are significantly different. One of the leading manufacturers of pizza cheese requires the product to be frozen to accommodate higher moisture contents and prevent rapid aging. Quality attributes and economic advantages have been known to disappear with improper thawing of frozen cheese.

Cheddar cheese still appears to be the leading choice for taco applications. Lower cost alternatives, such as processed cheese and imitation cheese, have negative connotations and lower perceived quality. The concept of taco cheese, a non-standard fresh cheese resembling cheddar, is generally analogous to the application of pizza cheese on pizzas. Quality and functionality can be refined for application on tacos.

SUMMARY OF THE INVENTION

It is the objective of the present invention to provide a method for producing a fresh, not frozen, cheese in a convenient form that has the economic advantage of optimized curd production separated from the development of functional properties by utilizing a streamlined manufacturing process. It is a further objective of this invention to provide a method for producing a fresh cheese that has early melt and longer shelf life characteristics. It is still a further objective of this invention to develop a method for making a fresh cheese with enhanced flavor and melt properties for application on pizza and tacos. Although the invention is particularly suitable for mozzarella-like cheese, it can be extended to cheddar-like and other cheeses.

DETAILED DESCRIPTION

In accordance with the methods of the invention, milk is standardized and pasteurized, as is generally known in the art. In one embodiment, the milk is fortified with ultrafiltered milk concentrate, water, nonfat milk solids, condensed skim milk, cream, or the like to increase the casein/fat ratio of the standardized milk product, i.e., to add protein the standardized milk product. Preferably the standardized milk contains protein in an amount ranging from about 3 wt. % to about 6 wt. %, more preferably from about 3.5 wt. % to about 4.5 wt. %, and fat in an amount ranging from about 1 wt. % to about 5 wt. %, more preferably from about 3 wt. % to about 4 wt. %.

By increasing the casein/fat ratio early in the process, less fat is wasted through removal with the whey. The fat content of the cheese product is then increased later in the process through the use of an extender, as described in more detail below.

The standardized milk is pasteurized by heating to a suitable temperature, e.g., about 190° F. The pasteurized milk is then cooled to a temperature preferably ranging from about 92° F. to about 100° F., more preferably about 96° F.

The cooled milk is added to a conventional cheese vat, stirred and inoculated with acid-producing bacteria. Lactic acid-, hetero-acid, and flavor producing bacteria for use in cheese making are well known in the art and the choice of a particular bacterium or combination of bacteria will depend on the type of cheese to be produced. Representative bacteria suitable for practice of the invention include, without limitation, *S. cremoris, S. lactis, S. citrovorous, S. paracitrovorus, S. thermophillus, S. durans, S. diacetilactis, S. faecalis, L. acidophilus, L. bulgaricus, L. brevis, L. casei, L. delbruekii, L. fermenti, L. heleveticus, L. lactis, L. plantarum, L. thermophillus, leuconsostoc eitrovorum, leuconsostoc mesenteroides, Bacteriumlinesn Micrococcus caseolyticus, Pediococcus cerevisiae, Pseudomonas fraga* and *proplonibacterium* species, such as *Propionibacterium shermanii*. Preferably a cultured starter medium containing *Streptococcus thermophilus* is added to facilitate high moisture with minimal protein breakdown. The standardized cheese milk is preferably preacidified to a pH of about 6.3. Food grade acids such, as lactic acid, acetic acid, phosphoric acid, citric acid and combinations thereof, can be used pre and post-pasteurization to help facilitate lowering the pH. It has been found that a secondary starter system, such as described in U.S. Pat. No. 5,895,671, the disclosure of which is incorporated herein by reference, provides a desirable texturing effect for incorporation of an extender. The targeted composition of the optimized curd is preferably about 30 to about 45%, more preferably about 42%, FDB (fat on dry basis) and preferably about 45 to about 55%, more preferably about 50%, moisture.

The mixture is stirred under suitable conditions, e.g., at about 96° F. for about one hour. A clotting enzyme is mixed into the ripened milk to cause the milk to coagulate. Suitable clotting enzymes include rennet, rennin, diluted rennin extract, vegetable-derived enzyme clotting agent and the like. Other enzymes such as pepsin and papain may be used alone or in combination with the rennet or rennin. After addition of the clotting enzyme, the mixture is allowed to set without stirring for about 20 to 40 minutes, typically about 30 minutes, to form a firm, set coagulum.

The solid mass is then cut and stirred to release the whey. The curd in whey mixture is heated to facilitate cooking of the curd, thereby expelling the whey. The curd is then separated from the whey by draining, and then the curd is cut into pieces for further processing. See generally Cheesemaking Practice 2$^{nd}$ edition R. Scott Elsevier Applied Science Publishers, the disclosure of which is incorporated herein by reference.

Cheese cost and functionality may be controlled by inclusion of a cheese extender. The cheese extender contains a source of fat, as well as one or more other ingredients such as water, low cost solids, cheese solids, emulsifying salts, and flavorings. The extender ingredients may be combined in a separate processing step or added directly to the molten cheese during the pasta filata mixing. It is preferred to make the extender in a separate processing step for better control and more efficient incorporation.

The source of fat may be added in any suitable form, such as butter, plastic cream, plastic fat, anhydrous milk fat, cream, whey cream, vegetable fat, or animal fat, to achieve the desired fat level in the finished cheese, which is preferably from about 35 to about 50% FDB, more preferably from about 35 to about 45% FDB. It is advantageous to keep the fat from becoming completely dispersed or homogenized into the extender and cheese curd, as this will result in poor melt performance. It is preferred to gently incorporate the fat as a marbleized phase or loosely bound ingredient with minimum shear.

The low cost solids are conveniently supplied in the form of starch, maltodextrin, and/or nonfat milk solids to promote moisture retention and modify texture for application targeted melt and chew. The emulsifying salts may vary, but citrates and phosphates are preferred to condition the protein for moisture and fat retention. Such a starch-based extender may be produced by cooking native rice or tapioca to a paste under high temperature and shear followed by gentle incorporation of fat and other ingredients under low shear, or by cooking modified or unmodified food starch to a paste and gently incorporating fat and other ingredients.

The extender may be added to fresh cheese curd after whey separation, to melted cheese during a traditional pasta filata processing step, or to aged cheese in a separate processing step. If the extender is added to curd directly after whey separation, preferably the curd is first passed through a grinder (such as a Wolfking grinder, commercially available from Wolfking A/S, Slagelse, Denmark) to create more surface area for contact with the extender. The temperature of incorporation is preferably about 160° F. under medium shear, followed by cooling to about 135–145° F. under low shear or kneading action. During this cooling step any liquid phase that may have separated during the incorporation will be reincorporated and the melted mass will develop the traditional structure of melted cheese.

If the extender is incorporated into melted cheese curd, the temperature of incorporation is preferably in the normal pasta filata range of 135–145° F. and subsequent cooling is not necessary. This may be done in a conventional pasta filata mixer/molder. If the extender is prepared as a separate step and incorporated into melted cheese, it is very important to control the viscosity of the extender to be compatible with, i.e. about the same as, the viscosity of the melted cheese. If the viscosity of the extender is either too high or too low, it will not incorporate properly, rendering the mixture unfit for further processing. Additionally, the curd or melted cheese cannot be so high in viscosity or tough that it will not soften and mix properly with the extender. It has been found that a curd made in accordance with U.S. Pat. No. 5,895,671, having a moisture of about 48–50%, fat-dry basis (FDB) of about 38–42%, and a pH of about 5.1–5.4, provides a very pliable texture for incorporating the extender.

In one embodiment, a 40 lb batch of extender is prepared by mixing 22.5 lb cold water, 4.8 lb cold whey cream, and 0.7 lb sodium tripolyphosphate in a processor equipped for direct steam heating and high shear mixing, such as a Readco Continuous Processor, commercially available from Readco Manufacturing, Inc. (York, Pa.). About 2.7 lb modified food starch (Frigex W—National Starch) is slowly added with high shear to prevent lumping. After the starch is hydrated, the mixture is heated to at least about 170° F. with stirring until the mixture thickens and the starch is cooked out. About 2.1 lb starch maltodetrin compound (Gel 700—USP Technologies) is melted and added to the hot mixture under high shear mixing. About 4.8 lb plastic cream is then added, and the final mixture is heated to about 195° F. for about 10 minutes. The extender can then be added to the cheese.

In another embodiment, some of the extender solids are made up of cheese solids and flavorings. For example, a 40 lb extender can contain 6.2 lb water, 1.8 lb whey cream, 1.8 lb plastic cream, 0.3 lb sodium tripolyphosphate, 0.2 lb salt, 0.05 lb annato color, 0.9 lb modified food starch, 28.2 lb cheddar cheese, and 0.55 lb Cheddar flavor.

In a preferred embodiment, a closed system processor is used to incorporate the extender into fresh curd, heat the curd and work the curd into a homogeneous mass. The processor heats the curd using steam rather than hot water. It also reincorpoates any separated liquid phase so that no components are lost. In a traditional processor, which also can be used in accordance with the invention, the curd is kneaded and stretched in hot water, but not sheared due to the significant amount of fat that would be lost in the cooker water. However, it is preferred to shear the curd to incorporate the extender uniformly in the cheese body. A preferred closed system processor is the Readco Continuous Processor, commercially available from Readco Manufacturing, Inc. (York, Pa.). The processor includes a high shear paddle extruder that mixes the curd and other ingredients quickly and uniformly. The paddle angles cab be adjusted so that the product can be sheared or kneaded.

Preferably mixing is performed in two stages. In the first stage, the ingredients are mixed under high shear, for example, using a low shear paddle configuration at 300 rpm with a 40 HP load, and heated, preferably to about 135 to about 165° F. In the second stage, the ground ingredients are kneaded to align the proteins in a unidirectional orientation, as will be discussed further below.

In one embodiment, 185 lb fresh curd, containing 54% moisture and 16.5% fat, is mixed with 15 lb extender in a jacketed processor equipped for high and low shear mixing. The mixture is heated to 160 to 170° F., preferably about 165° F., and mixed under high shear until the mass is homogeneous. The mass is then cooled to about 135 to 145° F., preferably about 140° F., under low shear, kneading action. In another embodiment, 185 lb melted cheese curd, containing about 49% moisture and 24% fat, is mixed with 15 lb extender in a jacketed processor equipped for medium shear mixing. The mixture is heated to maintain a temperature of about 135 to 145° F., preferably about 140° F., until the mass is homogeneous.

After the molten cheese, with or without extender, is removed from the processor, it is preferably extruded and cut prior to brining. Improved yield and quality can be achieved after the cheese has been formed and cut in the molten state with proper cooling. Rapid cooling results in a quick structure formation and efficient retention of liquid phase components. It is preferred that the brine temperature be as low as possible, preferably at least about 20° F., more preferably from about 20 to about 25° F., in order to facilitate cooling and retard the uptake of salt. Because the cheese in the brine absorbs salt, it is important to control the salt content of the cheese prior to brining to allow enough time for temperature reduction at the center of the chunk during the brining. Controlling the salt prior to brining can be accomplished by limiting or eliminating the addition of salt, cooker water or whey cream to the cheese curd, melted cheese and extender.

Preferably the cheese-extender mixture is extruded as a continuous rope, having a diameter ranging from about 1 to about 3 inches and a length ranging from 3 feet to about 7 feet, through a trough of cold water before being cut and brined. The partially cooled rope, which is preferably at a temperature ranging from about 110° F. to about 150° F., is then cut into smaller sections, preferably having a length ranging from about 2 inches to about 6 inches. The smaller chunks are then conveyed into a brine system, preferably at a temperature ranging from about 20° F. to about 30° F., for further cooling. The chunks are allowed to soak in the brine until sufficiently cooled. Preferably the chunks are in the brine for a time period ranging from about 15 minutes to about 90 minutes, more preferably from about 30 minutes to about 60 minutes.

Once the chunks are cooled, preferably to a core temperature of about 36 to about 44° F., more preferably about 40° F., they are removed from the brine, rinsed to remove the salt, air blown to remove excess water, and conveyed directly to a standard cheese shredder or dicer. If the brine temperature is about 20–25° F., it will take about 45 to about 60 minutes to reach a core temperature of about 45° F., and the salt level will be about 1.6 to about 2%. No intermediate packaging or cold storage is required as in a traditional pasta filata process. Additionally, no extra handling or sizing is required to prepare the cheese for slicing, shredding or dicing. An alternate method of size reduction involves the use of a water cannon. Cooled chunks are removed from the brine and transported in a stream of water under high pressure through a fixed set of knife blades. The resulting cheese pieces are separated from the water stream and dried prior to packaging. The water cannon has the advantage of reducing fragmented pieces and eliminating heat build up during size reduction.

The cut form may advantageously be designed to go directly to a cheese shredder or dicer without further packaging or sizing. In some embodiments, the cut form may be the final form of the product for customers, e.g. slice, dice or shred. Not only is the cut form convenient and efficient in shape, but its texture is improved by the extrusion prior to cutting. In a traditional pasta filata process, molten cheese is pumped into a forming mold prior to brining. This pumping action creates folding of cheese layers, which results in a random orientation of protein structure. The method of the present invention, through the extrusion step, creates a laminar flow, which results in unidirectional orientation of protein structure. This unidirectional orientation of protein structure allows for efficient alignment of the cheese to the blade of a typical cheese slicer, shredder or dicer. The efficient alignment of cheese structure with the cutting blades yields long smooth pieces with fewer fragmented pieces when compared to the traditional random structured-cheese.

In a preferred embodiment, a cheese-extender mass at 140° F. is fed through an extruder where the temperature drops to about 130 to 135° F. and the mass is shaped into a rope about 1.5 to 2.5 in, preferably 2.0 in, in diameter. The rope is cut continuously into sections having a length of about 2 to 8 in, preferably about 4 in. The ratio of the diameter of the extruded rope to its cut length preferably ranges from about 1:1 to 1:4, more preferably about 1:2. The resulting chunks are conveyed by cold water to a saturated brine system, 90% minimum salinity, set at about 20–25° F. The chunks are left floating in the brine until the core temperature has reached about 45° F. or below, preferably below 40° F., and the final salt content is not more than 2.0%, preferably not more than 1.8%. The cooling should take place as rapidly as possible to develop structure and targeted melt properties, preferably over a time period ranging from about 15 minutes to about 120 minutes, more preferably from about 30 minutes to about 60 minutes.

In one embodiment, the cooled chunks are then removed from the brine system, rinsed with cold water, and blown dry. The dry chunks may then be placed directly into a conventional slicer, shredder, or dicer to obtain the final form of the cheese. Packaging the slices, shreds, or diced particles is done in the usual manner. In another embodiment, the cooled chunks are removed from the brine system, drained, and placed in a continuous stream of cold water, which conveys the chunks under high pressure through a set of fixed blades to achieve the final form of the cheese. The resulting pieces are separated from the water stream, drained, blown dry and packaged in the usual manner. In another embodiment, the cooled chunks are separated from the brine and conveyed by a high-pressure stream of cold water through a static cutter to achieve the final cut form of the cheese. The high pressure stream flows through a pipe, which is preferably about 0.25 to 0.5 in greater than the width of the cheese chunk to provide a tight tolerance, creating sufficient flow pressure to go through the static cutter. After cutting the cheese pieces are separated from the water and dried prior to packaging.

Cheese manufactured by the present invention preferably has a finished composition of about 45 to about 65%, more preferably from about 50 to 56%, moisture; from about 30 to about 50%, more preferably from about 35 to about 45%, FDB (fat-dry basis); and from about 1 to about 3%, more preferably from about 1.6 to about 2.0%, salt; with a pH ranging from about 4.8 to about 6.0, more preferably from about 5.1 to about 5.4. Without having to be frozen, this cheese has the distinct advantages of early melt, about 10 days, and longer shelf life, 60–90 days, when compared to traditional Mozzarella, requiring about 14 days to melt and having a shelf life of about 45 days. When melted on a pizza or taco, the texture of this cheese remains soft and pliable for a longer period of time and has a full-bodied flavor and aroma.

EXAMPLES

Example 1

Preparation of Cheese Curd and Melted Cheese

Milk that has been standardized with UF milk concentrate and cream to a 4.0% protein and 3.5% fat level is pasteurized and cooled to 96° F. About 47,189 lb of the standardized milk is added to a conventional cheese vat while under gentle agitation. Next, 12 cans of frozen starter culture containing *Streptococcus thermophilus* bacteria, 800 lb of secondary starter medium prepared in accordance with U.S. Pat. No. 5,895,671, is added, and the mixture is allowed to agitate slowly for about 60 minutes. Sufficient coagulant, about 28 oz, is added to convert the cultured milk to a solid curd in about 27 minutes. After the curd mass forms, it is cut, healed and cooked to 108° F., and stirred for 5 min following normal cheesemaking practices. The cut curd in whey is discharged onto a draining belt where the whey is removed and the curd body develops. When the pH of the drained curd is about 5.2, the curd is cooled under a cold water spray and cut into curd pieces of about ⅜ by ⅜ by 3 inches for further processing. The yield of curd, 50.5% moisture and 42.5% FDB (fat-dry basis), was 7114.8 lb, 14.82%.

Melted cheese was obtained by placing about 400 lb of the curd pieces into a standard pasta filata cooker and heating directly with hot water to about 130 to 140° F. No salt was added to the cheese curd or the cooker water.

Example 2

Preparation of Pizza Cheese Extender

A 40 lb batch of extender is prepared by placing 22.5 lb cold water, 4.8 lb cold 40% fat whey cream, and 0.7 lb sodium tripolyphosphate in a steam injection processor equipped with high and low shear mixing. About 2.1 lb of modified food starch (Frigex W—National Starch) is added slowly to the cold liquid mixture under high shear mixing. After the starch has hydrated, the mixture is heated by direct steam to about 170° F. and held under low shear mixing until the consistency is thick and smooth. Then 2.1 lb of a starch-maltodextrin compound (Gel 700—USP Technology) is melted at about 180° F. and added to the extender mixture under low shear mixing. Finally, about 4.9 lb of plastic cream is added while stirring and the mixture is heated to 195° F. for about 10 minutes.

Example 3

Preparation of Taco Cheese Extender

A 40 lb batch of extender is prepared by placing 3.5 lb cold water, 1.8 lb 40% fat whey cream, and 0.3 lb sodium tripolyphosphate in a steam injection processor equipped with high and low shear mixing. About 0.9 lb modified food starch (Frigex W—National Starch) is added slowly to the cold liquid mixture under high shear mixing. After the starch has hydrated, the mixture is heated by direct steam to about 170° F. and held under low shear mixing until the consistency is thick and smooth. Then 28.2 lb cut Cheddar cheese, 1.8 lb plastic cream, 0.63 lb Cheddar flavor (H&R Flavors), 0.2 lb salt, and 0.05 lb annatto color are added to the mixture. Steam used during heating adds 2.62 lb water.

Example 4

Extender with Fresh Cheese Curd—Pizza Cheese

Cheese curd prepared as described in Example 1, about 185 lb, and extender prepared as described in Example 2, about 15 lb, are placed in a jacketed continuous processor with agitation designed for high initial shear and high initial temperature progressing to low exit shear and low exit temperature. Such a processor is available from Readco. The mixture is processed at an initial temperature of 160° F. under high shear followed by a cooling to 140° F. under low shear. Product exiting the processor is homogeneous and the texture is fibrous, much like Mozzarella cheese.

Example 5

Extender with Melted Cheese Curd—Pizza Cheese

About 185 lb melted cheese, 135 to 145° F., prepared as described in Example 1 and about 15 lb extender, 170° F., prepared as described in Example 2, are placed in a jacketed mixer equipped with medium shear mixing. The mixture is heated to maintain a temperature of about 140° F. while under medium shear mixing. The resulting mass is homogeneous and fibrous in texture, much like melted Mozzarella cheese.

Example 6

Extender with Melted Cheese—Taco Cheese

About 26.7 lb melted cheese, 135 to 145° F., prepared as described in Example 1, and about 13.3 lb extender, 170° F., prepared as described in Example 3, are placed in a jacketed mixer equipped with medium shear mixing. The mixture is heated to maintain a temperature of about 140° F. while under medium shear mixing. The resulting mass is smooth and homogeneous with a short texture, much like melted Cheddar cheese.

Example 7

Extrusion and Brine Cooling

About 200 lb of combined cheese-extender, prepared as described Example 4, at a temperature of about 140° F. is placed in the hopper of an extruder. The mixture is extruded as a continuous rope of about 2.0 in diameter through a trough of cold water about 6 ft long before being cut into sections about 4 in long. The resulting chunks, temperature about 135° F., are conveyed into a brine system, temperature at 23° F., for further cooling. After about 45 minutes the core temperature of a typical chunk is 45° F., and the salt content is about 1.8%. The chunks are then removed from the brine, rinsed with cold water, and dried under a stream of air. The chunks are now ready for final size reduction. The composition of the final cheese is about 53% moisture, 42% FDB (fat-dry basis), and 1.8% salt with a pH of about 5.2.

The preceding description has been presented with reference to presently preferred embodiments of the invention. Workers skilled in the art and technology to which this invention pertains will appreciate that alterations and changes in the described methods may be practiced without meaningfully departing from the principal, spirit and scope of this invention. Accordingly, the foregoing description should not be read as pertaining only to the precise methods described and illustrated in the accompanying drawings, but rather should be read consistent with and as support to the following claims which are to have their fullest and fair scope.

What is claimed is:
1. A method for making a fresh cheese comprising:
   pasteurizing and acidifying one or more dairy components to obtain a cheese dairy product;
   coagulating the cheese dairy product to form a coagulum comprising curd and whey;
   cutting the coagulum and removing the whey thereby leaving the curd;
   heating the curd using steam and kneading the curd to produce a fibrous mass;

the coagulating, cutting, heating and kneading steps being performed without intermediate freezing, cold storage or packing;

before or during heating, adding to the curd or to the fiberous mass an extender, the extender comprising at least one source of fat;

cutting the fiberous mass into sections;

cooling the fiberous mass sections in brine; and processing the cooled fiberous mass sections to produce a cheese product.

2. The method of claim 1, wherein the at least one source of fat is present in the extender in an amount of at least about 0.5 wt.%.

3. The method of claim 1, wherein the at least one source of fat is present in the extender in an amount ranging from about 0.5 wt.% to about 30 wt.%.

4. The method of claim 1, wherein the at least one source of fat is selected from the group consisting of butter, plastic cream, plastic fat, anhydrous milk fat, cream, whey cream, vegetable fat, and animal fat.

5. The method of claim 1, wherein the extender further comprises one or more low cost solids.

6. The method of claim 5, wherein the low cost solids are selected from the group consisting of starch, maltodextrin, and nonfat milk solids.

7. The method of claim 1, wherein the extender further comprises water.

8. The method of claim 1, heating further comprising heating the curd comprising heating the curd with a closed system processor.

9. The method of claim 1, the viscosity of the extender being approximately the same as a viscosity of the curd during heating.

10. The method of claim 1, further comprising extruding the fiberous mass as a continuous rope, wherein cutting the fiberous mass into sections comprises cutting the extruded continuous rope into sections.

11. The method of claim 10, extruding comprising extruding a fiberous mass having a unidirectional protein structure orientation.

12. The method of claim 11, further comprising cutting the cheese product parallel to the direction of the protein structure.

13. The method of claim 1, further comprising feeding the fiberous mass through a water bath prior to cutting the fiberous mass into sections and cooling the fiberous mass sections in brine.

14. The method of claim 1, feeding comprising feeding the fiberous mass through a water bath so that the fiberous mass is cooled to a temperature of about 110–150° F.

15. The method of claim 1, cooling the fiberous mass sections in brine comprising cooling the fiberous mass sections in brine having a temperature of about 20–30° F.

16. The method of claim 1, cooling the fiberous mass sections in brine comprising cooling the fiberous mass sections in brine for about 15–90 minutes.

17. The method of claim 1, the fiberous mass sections being soaked in the brine until the fiberous mass sections are cooled to a temperature of about 36 to 45° F.

18. The method of claim 1, processing the cooled fiberous mass sections to produce a cheese product comprising removing the cooled fiberous mass sections from the brine; and rinsing the fiberous mass sections.

19. The method of claim 1, the cheese product having a melting point of about 10 days.

20. The method of claim 1, the cheese product having a shelf life about 60–90 days.

21. A method of making cheese, comprising:

pasteurizing and acidifying one or more dairy components to obtain a cheese dairy product;

coagulating the cheese dairy product to form a coagulum comprising curd and whey;

cutting the coagulum and removing the whey thereby leaving the curd;

heating the curd using steam and kneading the curd to produce a fiberous mass; the coagulating, cutting, heating and kneading steps being performed without intermediate freezing, cold storage or packing;

before or during heating, adding to the curd or to the fiberous mass an extender, the extender comprising at least one source of fat;

extruding the fiberous mass as a continuous rope;

cutting the continuous rope into fiberous mass sections;

cooling the fiberous mass sections in brine; and processing the cooled fiberous mass sections to produce a cheese product.

22. A method of making cheese, comprising:

pasteurizing and acidifying one or more dairy components to obtain a cheese dairy product;

coagulating the cheese dairy product to form a coagulum comprising curd and whey;

cutting the coagulum and removing the whey thereby leaving the curd;

heating the curd using steam and kneading the curd to produce a fiberous mass;

the coagulating, cutting, heating and kneading steps being performed without intermediate freezing, cold storage or packing;

before or during heating, adding to the curd or to the fiberous mass an extender, the extender comprising at least one source of fat;

extruding the fiberous mass as a continuous rope having a unidirectional protein structure orientation;

cutting the continuous rope into fiberous mass sections;

cooling the fiberous mass sections in brine;

processing the cooled fiberous mass sections to produce a cheese product;

aligning a blade of a cutting mechanism with the direction of the protein structure of the fiberous mass; and cutting the cheese product parallel to the direction of the protein structure.

* * * * *

UNITED STATES PATENT AND TRADEMARK OFFICE
CERTIFICATE OF CORRECTION

PATENT NO. : 6,998,145 B2
DATED : February 14, 2006
INVENTOR(S) : T. Henry et al.

It is certified that error appears in the above-identified patent and that said Letters Patent is hereby corrected as shown below:

<u>Column 9,</u>
Line 29, delete "comprising heating the curd".

Signed and Sealed this

Eleventh Day of April, 2006

JON W. DUDAS
*Director of the United States Patent and Trademark Office*